US010909402B2

(12) United States Patent
Iwamoto (10) Patent No.: US 10,909,402 B2
(45) Date of Patent: Feb. 2, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kazunari Iwamoto, Kariya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/579,573

(22) Filed: Sep. 23, 2019

(65) Prior Publication Data

US 2020/0104622 A1 Apr. 2, 2020

(30) Foreign Application Priority Data

Sep. 28, 2018 (JP) .................. 2018-184798

(51) Int. Cl.
*G06K 9/20* (2006.01)
*G06K 9/00* (2006.01)
*G06T 11/00* (2006.01)

(52) U.S. Cl.
CPC ....... *G06K 9/2081* (2013.01); *G06K 9/00671* (2013.01); *G06T 11/00* (2013.01)

(58) Field of Classification Search
None
See application file for complete search history.

(56) References Cited

U.S. PATENT DOCUMENTS

| 2014/0292806 A1* | 10/2014 | Ohnishi | G06Q 10/06 345/629 |
| 2015/0215546 A1* | 7/2015 | Adachi | H04N 5/23296 348/240.2 |
| 2017/0255838 A1* | 9/2017 | Norieda | G06K 9/4671 |

FOREIGN PATENT DOCUMENTS

JP 2015-142181 A 8/2015

* cited by examiner

*Primary Examiner* — Michelle Chin
(74) *Attorney, Agent, or Firm* — Canon U.S.A., Inc. IP Division

(57) ABSTRACT

An information processing apparatus includes a detection unit that detects an object in an image, a processing unit that executes predetermined processing based on the detected object, a setting unit that sets a size range of the object to be subjected to the predetermined processing, and a display control unit that identifies an object to be excluded from the predetermined processing based on a setting set by the setting unit, among the objects detected by the detection unit as a target object of a size included in a range larger than the size range, and displays information indicating the identified object on a display unit.

13 Claims, 6 Drawing Sheets

| ID | LOCATION (X COORDINATE) | LOCATION (Y COORDINATE) | SIZE | DETECTABILITY |
|---|---|---|---|---|
| 1 | aa | ba | ca | |
| 2 | ab | bb | cb | |
| 3 | ac | bc | cc | |

501

| ID | LOCATION (X COORDINATE) | LOCATION (Y COORDINATE) | SIZE | DETECTABILITY |
|---|---|---|---|---|
| 1 | aa | ba | ca | UNDETECTABLE |
| 2 | ab | bb | cb | DETECTABLE |
| 3 | ac | bc | cc | UNDETECTABLE |

502

| ID | LOCATION (X COORDINATE) | LOCATION (Y COORDINATE) | SIZE | DETECTABILITY |
|---|---|---|---|---|
| 1 | aa | ba | ca | DETECTABLE |
| 2 | ab | bb | cb | DETECTABLE |
| 3 | ac | bc | cc | DETECTABLE |

FIG.6

INFORMATION PROCESSING APPARATUS, INFORMATION PROCESSING METHOD, AND STORAGE MEDIUM

BACKGROUND

Field of the Disclosure

The present disclosure relates to an information processing technology.

Description of the Related Art

Conventionally, there has been known a technology to suppress a false detection when an object included in an image is to be detected. The technology sets a range of a size for an object as a detection target (hereafter, referred to as "size range") and removes an object from a detection result if the object is detected as an object out of the size range.

Japanese Laid-open Patent Application 2015-142181 discusses a technology that sets a minimum size and a maximum size for a person's body as a detection target in an image to determine a size range of an object as a detection target and excludes a person's body out of the size range from a detection target.

When a size range for the object as a detection target is set and the object within an image is detected, an object that should be detected happens not to be detected because the size range is not properly set.

However, the technology discussed in Japanese Laid-open Patent Application 2015-142181 cannot help a user to appropriately set the size range for an object as a detection target in such a case where the object that should be detected is not detected. This happens because the technology does not identify whether the object that should be detected is not detected due to the size range the user sets.

SUMMARY

The present disclosure is directed to provide a technology which can help a user to appropriately set a size range for an object as a detection target.

In the present disclosure, an information processing apparatus includes a detection unit configured to detect an object in an image, a processing unit configured to execute predetermined processing based on the object detected by the detection unit, a setting unit configured to set a size range of the object to be subjected to the predetermined processing, and a display control unit configured to identify the object to be excluded from the predetermined processing based on a setting set by the setting unit, among the objects detected by the detection unit as a target object of a size included in a range larger than the size range, and to display information indicating the identified object on a display unit.

Further features of the present disclosure will become apparent from the following description of exemplary embodiments with reference to the attached drawings.

DESCRIPTION OF THE EMBODIMENTS

Exemplary embodiments according to the present disclosure will be described hereinafter with reference to accompanying drawings. A configuration shown in the exemplary embodiments described below is merely an example. A configuration may not be limited to the configuration illustrated in the present disclosure.

Figure 1:
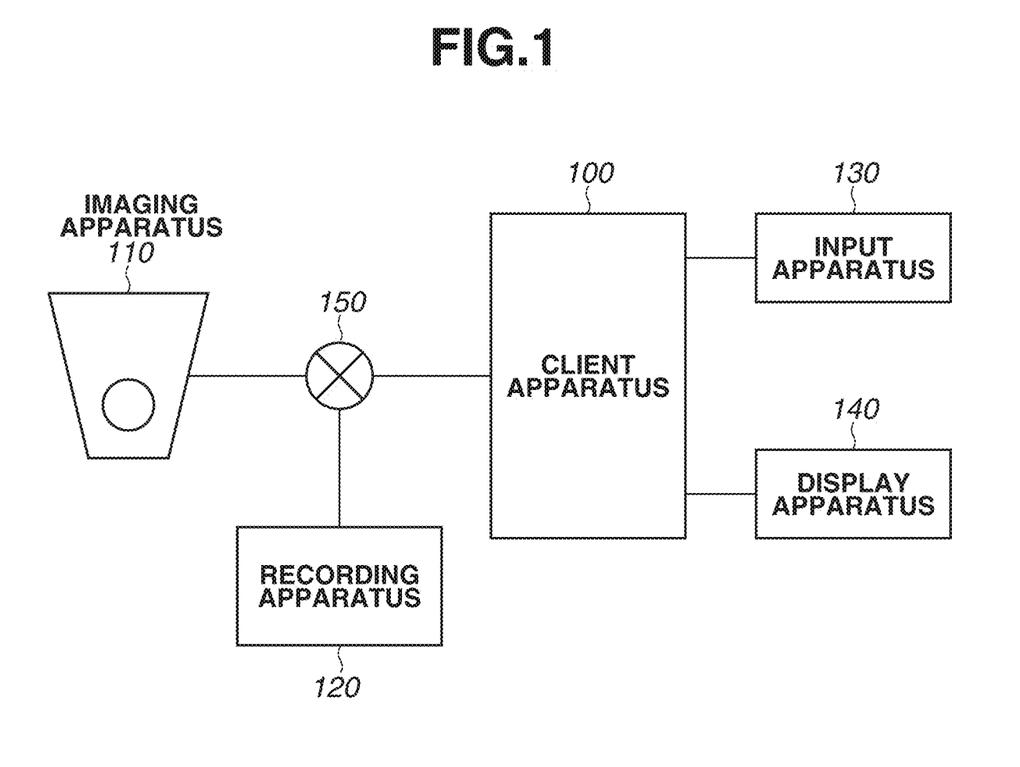
FIG. 1 is a diagram illustrating a system configuration.

FIG. 1 is a diagram illustrating a system configuration according to the present exemplary embodiment. The system according to the present exemplary embodiment includes a client apparatus 100, an imaging apparatus 110, a recording apparatus 120, an input apparatus 130, and a display apparatus 140.

The client apparatus 100, the imaging apparatus 110, and the recording apparatus 120 connect to each other via a network 150. The network 150 is implemented with a plurality of routers, switches, cables and the like conforming to a communication standards such as ETHERNET®.

The client apparatus 100 is an information processing apparatus that executes information processing on an image captured by the imaging apparatus 110. The information processing will be described below. The client apparatus 100 is realized by, for example, a personal computer in which a program to execute functions of the information processing described below is installed.

The imaging apparatus 110 captures an image. Image data based on the image captured by the imaging apparatus 110 and information related to a time when the imaging apparatus 110 captures the image are sent to the client apparatus 100 and the recording apparatus 120 via the network 150.

The recording apparatus 120 associates the image data of the image captured by the imaging apparatus 110 with the information about the time when the imaging apparatus 110 captures the image, and records the associated image data and time. The recoding apparatus 120 can send the image data of the image captured by the imaging apparatus 110 and the like to the client apparatus 100 in accordance with a request from the client apparatus 100.

The input apparatus 130 is realized by a user interface (UI) such as a mouse or a keyboard. The display apparatus 140 includes a liquid crystal display (LCD) and the like. The display apparatus 140 is connected to the client apparatus 100 via a display cable conforming to the communication standard such as high definition multimedia interface (HDMI®).

The display apparatus 140 functions as a display unit and displays an image captured by the imaging apparatus 110 or a setting screen related to the information processing described below. The display apparatus 140 and the client apparatus 100 can be provided in one body.

The network 150 connects the imaging apparatus 110 to the client apparatus 100. The network 150 includes a plurality of routers, switches, cables and the like conforming to the communication standard such as Ethernet®. The communication standard, a communication scale, and a communication configuration of the network 150 do not matter in the present exemplary embodiment as long as the network 150 enables communication between the imaging apparatus 110 and the client apparatus 100. For example, the network 150 can include an internet, a wired local area network (Wired LAN), a wireless local area network (Wireless LAN), a wide area network (WAN), and the like.

Figure 2:
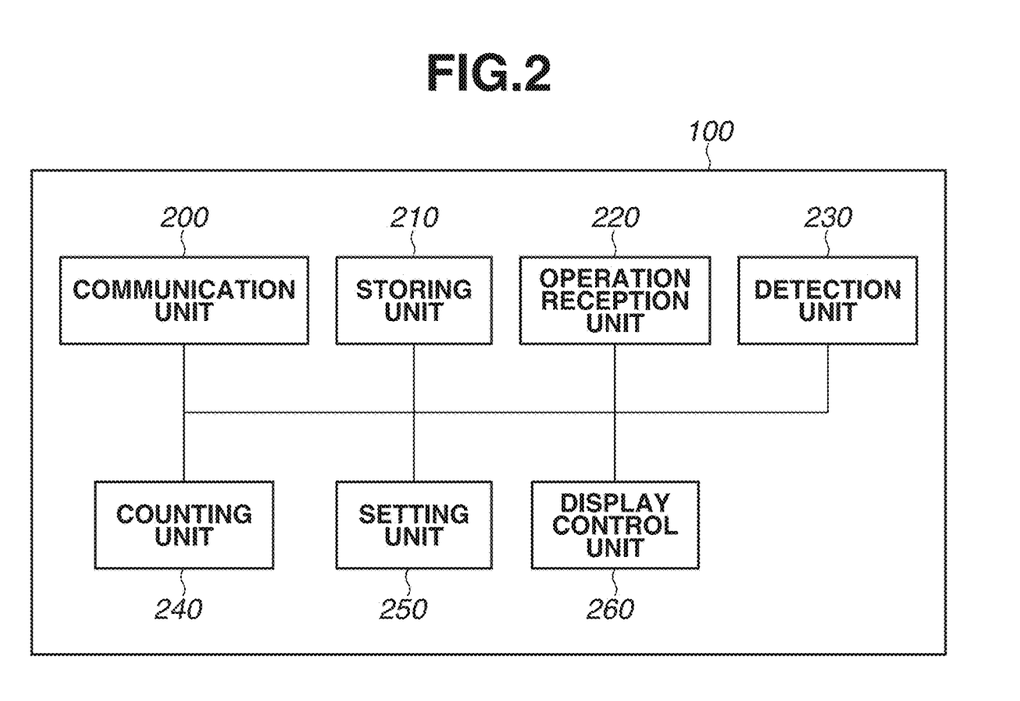
FIG. 2 is a diagram illustrating functional blocks in an information processing apparatus.

The information processing of the client apparatus 100 according to the present exemplary embodiment is described referring to functional blocks of the client apparatus 100 illustrated in FIG. 2. The client apparatus 100 includes a communication unit 200, a storing unit 210, an operation reception unit 220, a detection unit 230, a counting unit 240, a setting unit 250, and a display control unit 260.

A central processing unit (CPU) 600 of the client apparatus 100 executes a computer program stored in a read only memory (ROM) 620 to be described below of the client apparatus 100 and then accomplishes each of functional blocks in the client apparatus 100.

The communication unit 200 is realized by an interface (I/F) 640 to be described below and communicates with the imaging apparatus 110, the recording apparatus 120, or the like. For example, the communication unit 200 receives image data of an image captured by the imaging apparatus 110 and sends a control command to the imaging apparatus 110 to control the imaging apparatus 110.

The storing unit 210 stores the image data that the communication unit 200 receives. Further, the storing unit 210 stores information and the like related to settings that the setting unit 250 sets. The setting unit 250 is described below.

The operation reception unit 220 receives information related to a user's operation via the input apparatus 130. The operation reception unit 220, for example, receives the information about a location of an area where a human figure is detected as a target area.

The detection unit 230 executes processing such as pattern matching by making use of a matching pattern (as a dictionary), so that the detection unit 230 detects a human figure included in an image. The detection unit 230 takes a human figure within a size range set by the setting unit 250 as a detection target. The detection unit 230 according to the present exemplary embodiment refers to a maximum size and a minimum size for a human figure set by the setting unit 250 and, in a case where a size of a human figure detected from the image is out of the size range between the maximum size and the minimum size, the detection unit 230 excludes the human figure from a detection result. In this manner, the detection unit 230 takes the human figure within the size range set by the setting unit 250 as a detection target.

In the present exemplary embodiment, the detecting unit 230 takes a human figure as a detection target, but the detection target is not be limited to the human figure. For example, the detection unit 230 can detect an object such as a human face, a car, or an animal as a detection target. The detection unit 230 can perform detections of a plurality of types so as to detect specific objects of a plurality of types. In other words, the detection unit 230 can detect a predetermined object of various types in addition to a human figure from image data by executing processing such as a pattern matching.

The counting unit 240 counts the number of human figures detected by the detection unit 230. The setting unit 250 sets a target area, which is an area where the detection unit 230 detects a human figure, in the image captured by the imaging apparatus 110. In the present exemplary embodiment, the detection unit 230 detects a human figure within the target area as a target object. The setting unit 250 can set an area as a target area based on the information related to the user's operation, received by the operation reception unit 220, or can set a preregistered area as a target area.

The setting unit 250 sets a size range for a human figure to be subjected to predetermine processing based on the human figure detected by the detection unit 230.

The predetermined processing is, for example, processing performed by the display control unit 260 in which the information indicating the human figure within the size range is superimposed on the human figure within the image. For example, as the information indicating the human figure within the size range, a frame such as a circumscribing circle or a circumscribing rectangle each of which surrounds the human figure is superimposed on the human figure within the image. Then, the display control unit 260 displays, on the display apparatus 140, the image on which the information is superimposed.

The predetermined processing, for example, can be processing performed by the counting unit 240 in which the number of human figures within the size range is counted.

In the present exemplary embodiment, the setting unit 250 sets a size range of the human figure that the detection unit 230 detects as a detection target. Then, based on the size range set by the setting unit 250, the predetermine processing is performed on the human figure detected by the detection unit 230 as a detection target. The setting unit 250 can set a size range of an object to be subjected to the predetermined processing among objects detected by the detecting unit 230 from the target human figures of a detectable size.

The setting unit 250 according to the present exemplary embodiment sets the maximum size and the minimum size as the size range for the human figure as a detection target for the detection unit 230, based on the information related to the user's operation received by the operation reception unit 220. In this case, the detection unit 230 takes the person of a size included in the size range from the maximum size to the minimum size set by the setting unit 250 as a detection target.

The display control unit 260 displays an image captured by the imaging apparatus 110, a setting screen for the settings related to information processing according to the present exemplary embodiment, and the like on the display apparatus 140.

In addition, the display control unit 260 identifies a human figure to be excluded from a target of the predetermined processing among the human figures that the detection unit 230 detects in the target area as a target object of a size within a size range larger than the size range set by the setting unit 250 and the detection unit 230 detects within the target area. The display control unit 260 displays the information indicating the identified human figure on the display apparatus 140.

The display control unit 260 according to the present exemplary embodiment identifies a human figure to be excluded from a target of the predetermined processing among the human figures that the detection unit 230 detects in the target area as an object of any detectable size. The display control unit 260 displays information indicating the identified human figure on the display apparatus 140. That is, the display control unit 260 identifies a human figure of a size that is not included in the size range set by the setting unit 250 among the human figures that the detection unit 230 detects in the target area as any one of all detectable target human figures. The display control unit 260 displays information indicating the identified human figure on the display apparatus 140.

Figure 3:
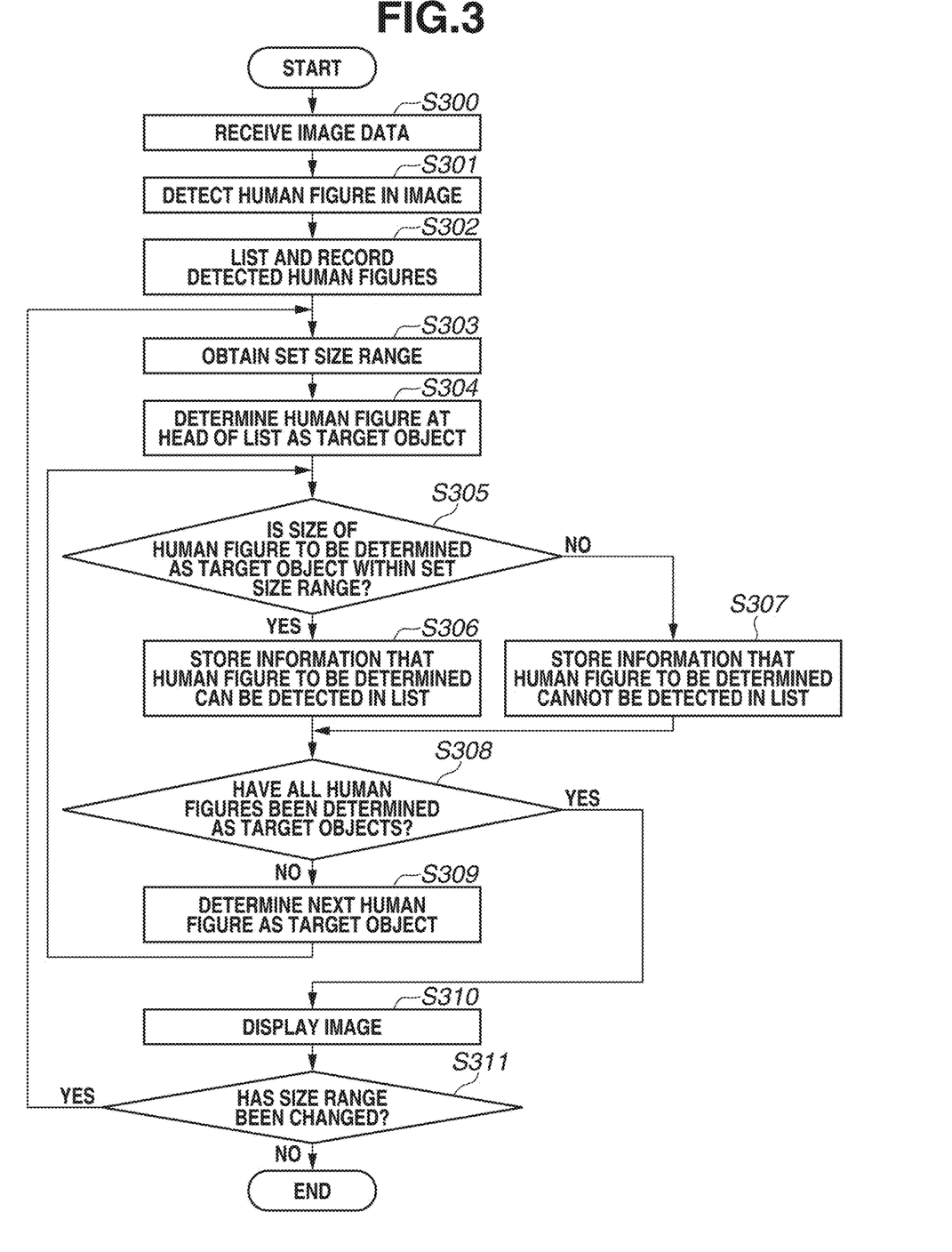
FIG. 3 is a flowchart illustrating a flow of notification processing.

Information processing performed in the client apparatus 100 according to the present exemplary embodiment is explained referring to FIGS. 3 and 4A to 4D. FIG. 3 is a flowchart illustrating a flow of notification processing performed in the client apparatus 100. FIGS. 4A to 4D are schematic diagrams describing the information processing performed in the client apparatus 100 according to the present exemplary embodiment.

The flowchart illustrated in FIG. 3 is executed and the client apparatus 100 can notify a user whether a human figure in an image the imaging apparatus 110 captures can be detected within the size range currently set by the setting unit 250. The user receives the notification and can properly set the size range.

The processing of the flowchart illustrated in FIG. 3 starts in accordance with an instruction of a user. In the present exemplary embodiment, the processing illustrated in FIG. 3 is executed in a setting mode for setting the target area, the size range, and the like. When the processing illustrated in FIG. 3 ends, the setting mode is switched to an operation mode, and the detection unit 230 detects a human figure based on the set size range.

The processing of the flowchart illustrated in FIG. 3 is executed according to each of functional blocks illustrated in FIG. 2, which is realized by the CPU 600 of the client apparatus 100 executes the computer program stored in the ROM 620 of the client apparatus 100.

Prior to the processing of the flowchart illustrated in FIG. 3, setting of the maximum size and the minimum size and setting of the target area as a target object are accomplished in advance. The settings made in advance regarding the maximum size, the minimum size, and the target area can be a default setting registered in advance or can be a setting set by the user in advance.

Figure 4A:
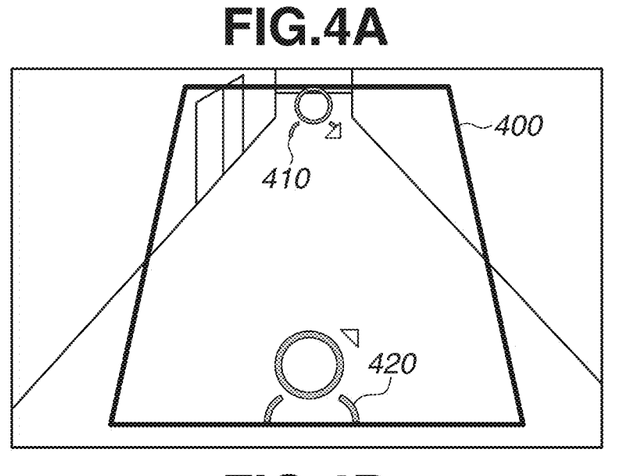
FIGS. 4A, 4B, 4C, and 4D are diagrams describing information processing.

As illustrated in FIG. 4A in the present exemplary embodiment, an image captured by the imaging apparatus 100 is displayed on the display apparatus 140. In this situation, the user refers to the image on the display apparatus 140 and performs settings regarding the maximum size, the minimum size, and the target area.

An area 400 illustrated in FIG. 4A shows a target area. In the present exemplary embodiment, the detection unit 230 takes a human figure within the target area as a detection target. The operation reception unit 220 receives, via the input apparatus 130, information indicating a location of the target area designated by the user. The setting unit 250 sets a target area based on the information received by the operation reception unit 220. The location of the target area is designated with an X coordinate and a Y coordinate of each vertex of the target area, regarding an end point at the lower left of the image as an origin point.

A marker 410 in FIG. 4A shows the minimum size, while a marker 420 in FIG. 4A shows the maximum size. In a case where the detection unit 230 compares a size (the number of pixels) in a longitudinal direction of an image of a human figure's upper body detected in the detection area with a size (the number of pixels) in a longitudinal direction of the image of the marker 410 showing the minimum size, and the size for the human figure's upper body is smaller than the size for the image of the marker 410, the detection unit 230 excludes the human figure from a detection result. On the other hand, in a case where the detection unit 230 compares the size (the number of pixels) in a longitudinal direction of the image of the human figure's upper body detected in the detection area with a size (the number of pixels) in a longitudinal direction of the image of the marker 420 showing the maximum size, and the size for the human figure's upper body is larger than the size for the image of the marker 420, the detection unit 230 excludes the human figure from the detection result. The detection unit 230 according to the present exemplary embodiment uses a collation pattern (dictionary) of a human figure's upper body to execute pattern matching and the like, thereby detecting the human figure's upper body within the target area.

The operation reception unit 220 receives, via the input apparatus 130, information of the marker 410 and the marker 420 each of which is changed in size by the user. In the present exemplary embodiment, the user can drag a triangle mark shown at the marker 410 and the marker 420 respectively to adjust the size of the marker 410 and the maker 420. The setting unit 250 sets the size of the marker 410 as the minimum size and sets the size of the marker 420 as the maximum size. The size of the marker 410 and the size of the marker 420 are the information received by the operation reception unit 220.

The flowchart illustrated in FIG. 3 is now described. In step S300, the communication unit 200 receives image data of an image captured by the imaging apparatus 110.

Figure 4B:
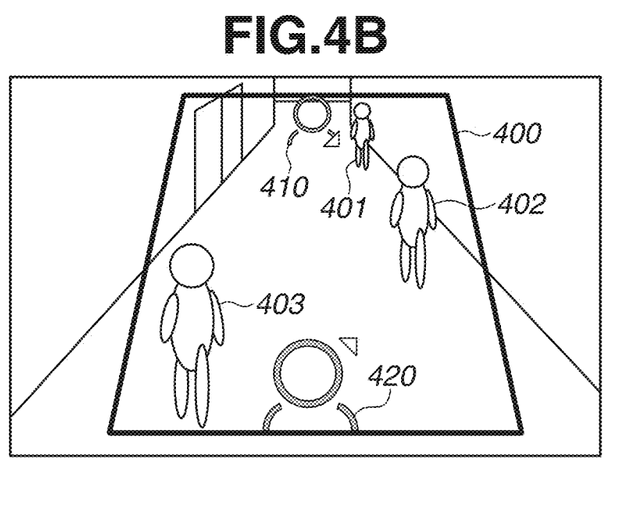

In step S301, the detection unit 230 detects a human figure included in a target area without considering the setting of the size range, that is, detects an object having any detectable size. FIG. 4B shows an image where the target area 400, the marker 410, and the marker 420 are superimposed on the image that the communication unit 200 has received in step S300. In FIG. 4B, the human FIGS. 401 to 403 are human figures included in the target area 400. In the example shown in FIG. 4B, the detection unit 230 detects each of three human FIGS. 401 to 403.

Figure 5:
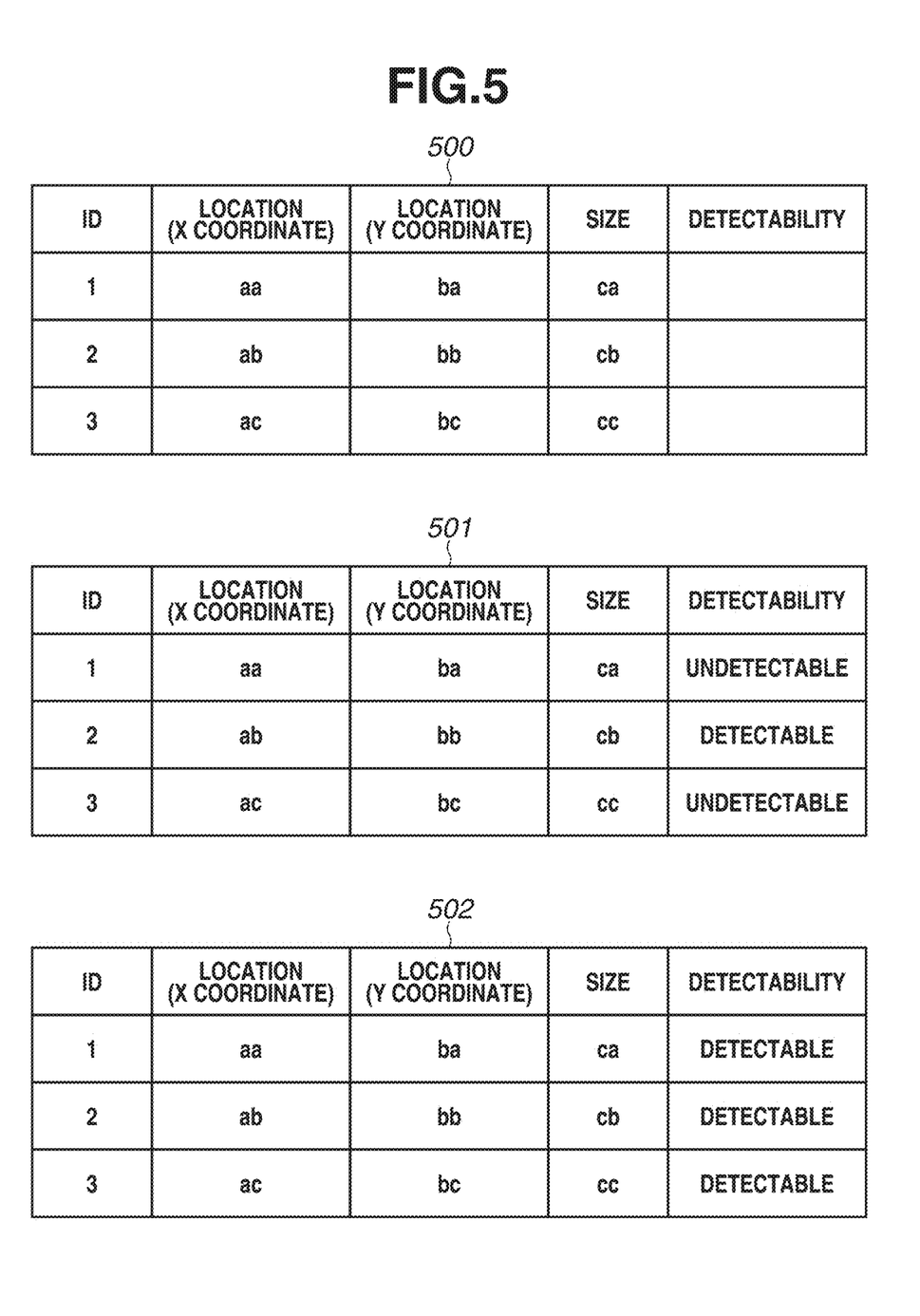
FIG. 5 illustrates data tables for the information processing.

In step S302, the storing unit 210 gives an identification (ID) for each of human figures detected by the detection unit 230 in step S301, and generates a list in which the ID, the location, and the size of the detected human figure to store the generated list. A list 500 shown in FIG. 5 is a data table to be stored by the storing unit 210 in the processing of step S302. A data column "detectability" of the list 500 is explained below.

In the example shown FIG. 4B, an ID "1" is given to the human FIG. 401, an ID "2" is given to the human FIG. 402, and an ID "3" is given to the human FIG. 403. In the present exemplary embodiment, the IDs given to each of the detected human figures are provided as a number in the order of detection. However, for example, the ID can be provided as a number in the order of the human figure's location in the image from the top to the bottom, and may not be limited to the specific order.

In the present exemplary embodiment, the location of the human figure is represented by a center of gravity of the upper body area of the human figure detected in the image, and is determined by the coordinates (X, Y) with respect to an origin that is the end point at the lower left of the image. The size of the human figure is determined by the number of pixels in a longitudinal direction of the upper body area of the human figure detected in the image.

In step S303, the display control unit 260 obtains the information of the size range set by the setting unit 250. In the present exemplary embodiment, the display control unit 260 obtains the information of the maximum size and the minimum size set by the setting unit 250. In the example shown in FIG. 4B, the display control unit 260 obtains the information of the sizes of the marker 410 and the marker 420.

In step S304, the display control unit 260 determines a human figure stored at a head of the list as a target object, based on the list stored by the storing unit 210 in the step S302. In the present exemplary embodiment, the display control unit 260 determines the human FIG. 401 with the ID "1" as a target object based on the list 500.

In step S305, it is determined whether the size of the human figure as a target object falls within the size range, which is setting information obtained in step S303. In a case where the size of the human figure as a target object falls within the size range, which is the setting information obtained in step S303 (YES in step S305), the processing proceeds to step S306. In a case where the size of the human figure as a target object does not fall within the size range, which is the setting information obtained in step S303 (NO in step S305), the processing proceeds to step S307.

In step S306, the storing unit 210 stores, into the list, information indicating that the human figure as the target object can be detected under the current setting of the size range. On the other hand, in step S307, the storing unit 210 stores, into the list, information indicating that the human figure as the target object cannot be detected under the current setting of the size range.

The storing unit 210 stores, into the list, a flag "1" in a case where the human figure as a target object can be detected (in step S306). The storing unit 210 stores a flag "2" in a case where the human figure as a target object cannot be detected (in step S307).

In step S308, it is determined whether all of the human figures subjected to ID given in the image are taken as target objects. In a case where all of the human figures subjected to ID given in the image are taken as target objects (YES in step S308), the processing proceeds to step S310. In a case where there remains any human figures subjected to ID given in the image not taken as target objects (NO in step S308), the processing proceeds to step S309.

In step S309, the display control unit 260 determines the human figure as a target object among the human figures remaining as the non-target objects, in the order of the number of the ID based on the list stored by the storing unit 210 in step S302.

As explained above, the processing from step S305 to step 309 is repeated until each of all the human figures in the image are determined as a target object and none of all the human figures in the image remains a non-target object. A list 501 shown in FIG. 5 is a data table into which the storing unit 210 stores information while the processing from step S305 to step S309 is repeated until each of all the human figures in the image are determined as a target object in the image shown in FIG. 4B. The list 501 indicates that the human FIG. 401 with the ID "1" and the human figure with the ID "3" are undetectable and the human FIG. 402 with the ID "2" is detectable.

In step S310, the display control unit 260 identifies the human figure to be excluded from a target of the predetermined processing among the human figures that the detection unit 230 detects in the target area as an object of any one of all detectable sizes based on the list that the storing unit 210 stores. Specifically, in the example shown in FIG. 4B, the display control unit 260 identifies the human FIGS. 401 and 403 each of which has the "detectability" of no, based on the list 501 the storing unit 210 stores. And, the display control unit 260 displays the information of the identified human figures on the display apparatus 140 based on the list 501 the storing unit 210 stores. The information displayed here on the display apparatus 140 is described below with reference to FIG. 4C.

The predetermined processing may be processing to superimpose, on the image, a frame which indicates the human figure so that the user can identify the human figure included in the size range, or processing to count the number of the human figures included in the size range by the counting unit 240.

The human figure to be excluded from the predetermined processing is a human figure of a size that is not within the size range set by the setting unit 250. Thus, the display control unit 260 identifies the human figure of a size out of the size range set by the setting unit 250 among the human figures that the detection unit 230 detects in the target area. The display control unit 260 displays the information indicating the identified human figure on the display apparatus 140. The display control apparatus 260 according to the present exemplary embodiment superimposes, on the image, an icon indicating that the human figure of a size out of the size range set by the setting unit 250 is undetectable in the current size range. And, the display control apparatus 260 displays the resulted image with the icon on the display apparatus 140.

In the present exemplary embodiment, in step S310, the display control unit 260 displays, on the display apparatus 140, the image on which the frame indicating the human figure of the size included in the size range so that the user can identify a human figure among the human figures detected by the detection unit 230 in the target area is superimposed. At the same time, with the current setting of the size range, the display control unit 260 superimposes, on the image, information that is provided respectively to the detectable human figure and the undetectable human figure in accordance with different display manners so that the user can distinguishably identify the human figure that is detectable or undetectable due to the current setting of the size range. And, the display control unit 260 displays the resulted image with the information on the display apparatus 140.

Figure 4C:
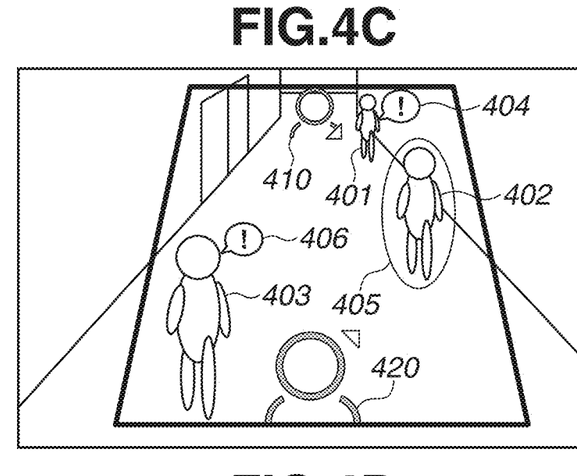

FIG. 4C shows one example of the image to be displayed on the display apparatus 140 in accordance with the processing by the display control unit 260 in step S310. As shown in FIG. 4C, balloon marks 404 and 406 each including an exclamation mark indicate that each of the human figures is undetectable under the current setting. Those marks are superimposed on the image so as to indicate each of the human FIGS. 401 and 403. In the present exemplary embodiment, a frame 405 indicates that the human figure is detectable due to the current setting of the size range. In the example shown in FIG. 4C, such a frame is superimposed on the human FIG. 402.

In step S311, the operation reception unit 220 determines whether information in which the maximum size or the minimum size is changed is received. In a case where the operation reception unit 220 does not receive the information in which the maximum size or the minimum size is changed (No in step S311), the processing ends. On the other hand, the operation reception unit 220 receives the information in which the maximum size or the minimum size is changed (YES in step S311), the setting unit 250 sets the size range based on the information received by the operation reception unit 220, and the processing proceeds to step S303.

Figure 4D:
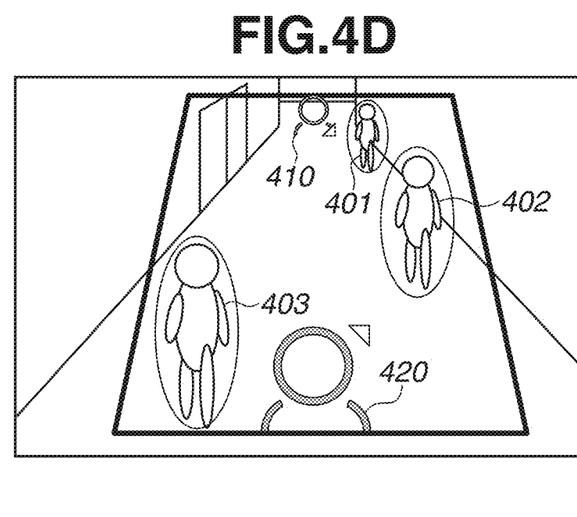

The processing of step S303 to S310 is performed again in a case where the user changes the size range in step S311. Specifically, information of the size range reset by the user is obtained in step S303, and in step S304, the human figure stored at the head of the list is determined as a target object again based on the list stored in the storing unit 210. Then, the processing of step S305 to step S309 is repeated based on the information of the size range reset by the user until all the human figures in the image are taken as a target object again. At this time, in a case where the user properly sets the size range, the information "detectability" in the list 501 is updated through the processing of step S305 to step S309, and then and a list 502 is obtained. In step S310, the display control unit 260 displays, on the display apparatus 140, the information indicating whether the human figure is detectable due to the current setting of the size range, based on the updated list. FIG. 4D shows an image that the display control unit 260 displays on the display apparatus 140 based on the list updated in step S311 through the processing of step S303 to step S310.

As explained above, the client apparatus 100 executes the processing of the flowchart shown in FIG. 3, thereby notifying the user of information whether the human figure existed in the image captured by the imaging apparatus 110 is detectable in accordance with the maximum size and the minimum size, set by the user.

In the present exemplary embodiment, a marker indicating the minimum size is superimposed on the image at the center of an upper side of the image, and a marker indicating the maximum size is superimposed on the image at the center of a lower side of the image. However, the superimposing configuration of those makers are not limited to those described above. For example, the maker can be superimposed on a detected object.

Specifically, when one human figure is detected in the target area and the detected human figure exists in the upper half of the target area, the marker indicating the minimum size is superimposed on that detected human figure. On the other hand, when one human figure is detected in the target area and the detected human figure exists in the lower half of the target area, the marker indicating the maximum size is superimposed on that detected human figure.

When two or more human figures exist in the target area, the marker indicating the minimum size is superimposed on the human figure existing on the most upper side of the target area, while the marker indicating the maximum size is superimposed on the object existing in the most lower side of the target area. According to this configuration, the locations of the markers indicating the maximum size and the minimum size approach the location of the human figure in the image so that the user can set the maximum size and the minimum size without any difficulties.

One or more functions of the client apparatus 100 according to the present exemplary embodiment can be included in the imaging apparatus 110. For example, the imaging apparatus 110 can include the detection unit 230.

In this case, in step S301 in the processing shown in FIG. 3, the detection unit 230 in the imaging apparatus 110 detects a human figure in a target area as an object of any one of all detectable sizes based on the information of the target area, which has been sent from the client apparatus 100. The imaging apparatus 110 sends the information indicating the location and the size of the detected human figure to the client apparatus 100.

The information of the size range set through the processing shown in FIG. 3 is sent from the client apparatus 100 to the imaging apparatus 110. In the operation mode, the detection unit 230 in the imaging apparatus 110 detects a human figure in the target area based on the sent information of the size range and the size, and sends the information indicating the location and the size of the detected human figure to the client apparatus 100.

As described above, in a case where there is a human figure that is undetectable among human figures included in the image based on the maximum size and the minimum size set by the user, the client apparatus 100 according to the present exemplary embodiment provides notification indicating that the human figure is undetectable. Accordingly, the user can recognize that the setting of the size range is not proper and thereby can appropriately set the size range of the object as a target object.

A hardware configuration in the client apparatus 100 to realize each function of the client apparatus 100 is described with reference to FIG. 6.

The client apparatus 100 according to the present exemplary embodiment includes the CPU 600, a random access memory (RAM) 610, the ROM 620, a hard disk drive (HDD) 630, and the I/F 640.

The CPU 600 integrates and controls the client apparatus 100 as a central processing apparatus.

The RAM 610 temporarily records a computer program the CPU 600 executes. The RAM 610 provides the CPU 600 with a work area where the CPU 600 executes the processing. For example, the RAM 610 works as a frame memory and works as a buffer memory.

The ROM 620 stores a program and the like according to which the CPU 600 controls the client apparatus 100. The HDD 630 records image data and the like.

The I/F 640 communicates with an external apparatus (for example, the imaging apparatus 110) via the network 150 in accordance with transmission control protocol/internet protocol (TCP/IP), hypertext transfer protocol (HTTP) or the like.

The exemplary embodiment described above explains the example where the CPU 600 executes the processing, but an dedicated hardware can execute at least a part of the processing that the CPU 600 executes. For examples, a graphics processing unit (GPU) can execute processing to display a graphical user interface (GUI) or the image data on the display apparatus 140. A direct memory access (DMA), which functions as a transfer apparatus, can execute processing to read a program code from the ROM 620 and develop the program code into the RAM 610.

Figure 6:
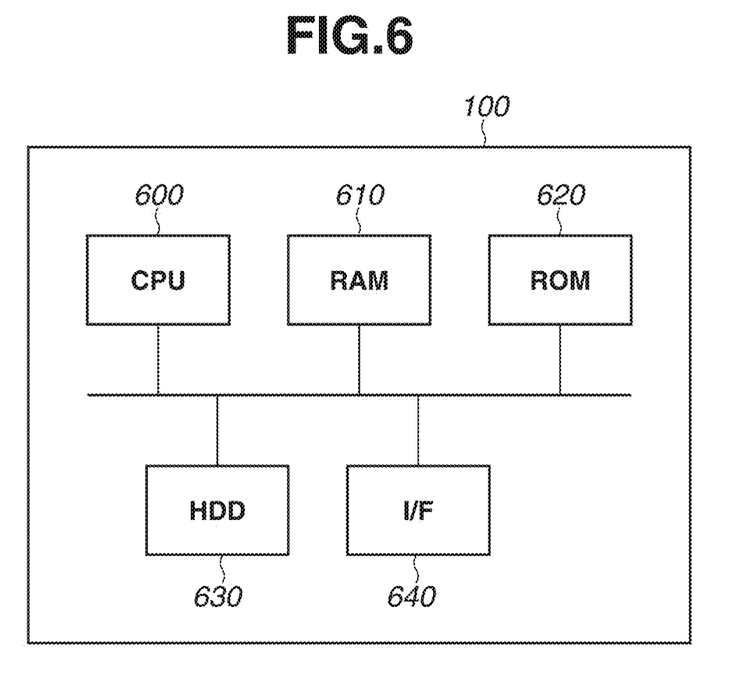
FIG. 6 is a diagram illustrating a hardware configuration in the information processing apparatus.

The hardware shown in FIG. 6 can realize each unit in the client apparatus 100, or a software can realize each unit in the client apparatus 100.

The present exemplary embodiment described above is presented to explain the present disclosure, but the present exemplary embodiment merely shows an exemplified example which embodies the present disclosure. Therefore, the technical scope of the present disclosure shall not be narrowly interpreted due to the exemplary embodiment. That is, the present disclosure can be realized in various embodiments within the scope of the technical idea and the main features. For example, any combinations of exemplary embodiments can be included in the present description.

The present disclosure can help a user to appropriately set a size range of an object as a detection target according to each of the exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-184798, filed Sep. 28, 2018, which is hereby incorporated by reference herein in its entirety.

What is claimed is:

1. An information processing apparatus comprising a computer executing instructions that, when executed by the computer, cause the computer to function as:
   a setting unit configured to set a first size range of an object to be subjected to object counting processing;
   a detection unit configured to detect one or more objects in an image, the one or more objects having a size which is included in a second size range broader than the first size range set by the setting unit;
   an identifying unit configured to identify, from the one or more objects detected by the detection unit in the image, an object having a size which is included in the second size range but not included in the first size range; and
   a display control unit configured to cause a display unit to display information indicating the identified object so as to differentiate the identified object from an object having a size which is included in the first size range.

2. The information processing apparatus according to claim 1, wherein the second size range corresponds to a size of an object which the detection unit is capable of detecting in the image.

3. The information processing apparatus according to claim 1,
   wherein the information corresponds to a mark indicating the identified object in the image,
   wherein the display control unit causes the display unit to display the image on which the mark is superimposed.

4. The information processing apparatus according to claim 1, wherein the instructions further cause the computer to function as: a counting unit configured to perform the object counting processing for counting a number of objects each having a size included in the first size range in the image.

5. The information processing apparatus according to claim 1, wherein the first size range is included in the second size range.

6. The information processing apparatus according to claim 1, wherein the setting unit configured to set the first size range based on a user instruction.

7. An information processing method comprising:
   setting a first size range of an object to be subjected to object counting processing;
   detecting one or more objects in an image, the one or more objects having a size which is included in a second size range broader than the first size range set in the setting;
   identifying, from the one or more objects detected in the detecting in the image, an object having a size which is included in the second size range but not included in the first size range; and
   causing a display unit to display information indicating the identified object so as to differentiate the identified object from an object having a size which is included in the first size range.

8. The information processing method according to claim 7,
   wherein the second size range corresponds to a size of an object which the detecting is capable of detecting in the image.

9. The information processing method according to claim 7,
   wherein the information corresponds to a mark indicating the identified object in the image, and
   wherein the causing causes the display unit to display the image on which the mark indicating the identified object is superimposed.

10. The information processing method according to claim 7, further comprising performing the object counting processing for counting a number of objects each having a size included in the first size range in the image.

11. The information processing method according to claim 7, wherein the first size range is included in the second size range.

12. The information processing method according to claim 7, wherein the setting sets the first size range based on a user instruction.

13. A non-transitory computer-readable storage medium storing a program for executing an information processing method of an information processing apparatus, the method comprising:
   setting a first size range of an object to be subjected to object counting processing;
   detecting one or more objects in an image, the one or more objects having a size which is included in a second size range broader than the first size range set in the setting;
   identifying, from the one or more objects detected in the detecting in the image, an object having a size which is included in the second size range but not included in the first size range; and
   causing a display unit to display information indicating the identified object so as to differentiate the identified object from an object having a size which is included in the first size range.

* * * * *